United States Patent [19]

See et al.

[11] Patent Number: 4,873,434

[45] Date of Patent: Oct. 10, 1989

[54] SCANNING OPTICAL MICROSCOPE USING SINGLE LASER BEAM

[75] Inventors: Chung W. See, London, England; Mehdi Vaez-Iravani, Peekskill, N.Y.

[73] Assignee: National Research Development Corporation, London, United Kingdom

[21] Appl. No.: 75,508

[22] Filed: Jul. 20, 1987

[30] Foreign Application Priority Data

Jul. 18, 1987 [GB] United Kingdom ............... 8617570

[51] Int. Cl.$^4$ ............................................. G02F 1/11
[52] U.S. Cl. .................................. 250/235; 350/358
[58] Field of Search ...................... 250/234, 235, 550; 350/358, 509, 527

[56] References Cited

U.S. PATENT DOCUMENTS

| | | | |
|---|---|---|---|
| 3,531,184 | 9/1970 | Adler | 350/358 |
| 3,796,495 | 3/1974 | Laub | 350/358 |
| 4,455,485 | 6/1984 | Hosaka et al. | 350/358 |

Primary Examiner—David C. Nelms
Assistant Examiner—Stephone B. Allen
Attorney, Agent, or Firm—Cushman, Darby & Cushman

[57] ABSTRACT

A scanning optical microscope which comprises a source of optical radiation and means for focussing radiation from the source into an interrogating spot on a surface under examination. The spot is deflected about a point on the surface, and the surface topography is measured by measuring the amplitude and/or phase of the radiation reflected from the surface at the spot position.

9 Claims, 3 Drawing Sheets

SCANNING OPTICAL MICROSCOPE USING SINGLE LASER BEAM

BACKGROUND OF THE INVENTION

This invention relates to optical phase scanning devices using an acousto-optical beam deflector, and more particularly, to scanning optical microscopes using a single laser beam.

The scanning optical microscope (SOM) has progressed to a stage where it constitutes a very powerful non-destructive examination tool. However, the classic design, which responds primarily to the intensity of light, experiences difficulties in producing high contrast images when examining objects showing small scale topography or refractive index variation. Various techniques to overcome this problem have been reported.

Laub, L. J.: 'ac Heterodyne profilometer', J. Opt. Soc. Am. 1973, 62, p. 737.

Huang C. C.: 'Optical heterodyne profilometer', Opt. Eng., 1984, 23 (4), pp. 365-370.

Jungerman, R. L., Hobbs, P. C. D., and Kino, G. S.: 'Phase sensitive scanning optical microscope', Appl. Phys. Lett., 1984, 45 (8), pp. 846-848.

See, C. W., Vaez Iravani, M., and Wickramasinghe, H. K.: 'Scanning differential phase contrast optical microscope: application to surface studies', Appl. Opt. 1985, 24 (15). pp. 2373-2379.

Vaez Iravani, M.: 'Fibre-optic scanning differential interference contract optical microscope', Electron. Lett., 1986, 22 (2). PP. 103-105.

In the majority of these prior art microscopes, the imaging is performed by extracting the phase information imposed on the interrogating beam. We have devised a new technique which results in an optical differential amplitude image, and thus substantially enhances the contrast.

SUMMARY OF THE INVENTION

According to the present invention there is provided a scanning optical microscope comprising a source of optical radiation, means for focussing radiation from the source into an interrogating spot on a surface under examination, means for deflecting the spot about a point on the surface and means for measuring the amplitude and/or phase of the radiation reflected from the surface.

BRIEF DESCRIPTION OF THE DRAWINGS

An embodiment of the invention will now be described by way of example with reference to the accompanying drawings in which.

DETAILED DESCRIPTION OF THE PREFERRED EMBODIMENT

Figure 1:
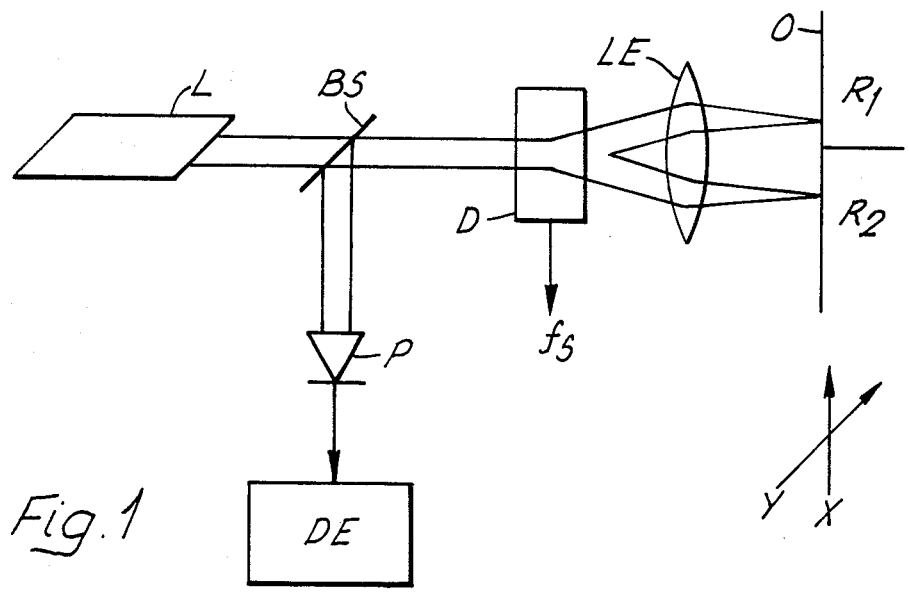
FIG. 1 is a diagrammatic representation of a scanning optical microscope in accordance with the invention.

The basic elements of a system in accordance with an embodiment of the invention are shown in FIG. 1. In FIG. 1a scanning optical microscope has been modified so that the interrogating spot moves sinusoidally over a small distance between points R1 and R2 on the sample surface. Any structural variation on the sample surface such as topography, or reflectivity, will result in an AC signal at the deflection frequency whose strength is a measure of the variation.

In this arrangement, a He-Ne laser L is used whose output is first passed through a standing wave acousto-optic beam deflector D, operating at a frequency $f_s$ of 1.7 MHz. The beam is subsequently focused onto the object O by means of lens LE. The r.f. power into the beam deflector is adjusted so that the beam moves through a fraction of one focal spot diameter on the object. The reflected beam is then directed towards a photodetector P, via a beam splitter BS.

To consider the theory of operation, let us represent the received optical beam as $$S = A\{1 + E \cos \omega_s t\} \quad (1)$$

where A is the amplitude of the beam, E is the variation in this amplitude due to surface structure, and $\omega_s$ is the deflection frequency. The detector output current, $I_{out}$, is proportional to the intensity of the received beam. Hence, $$I_{out} = \xi A^2 \{1 + E \cos \omega_s t + E^2 \cos^2 \omega_s T\} \quad (2)$$

with $$\xi = \nu e / \hbar \omega_0$$

where $\nu$ is the quantum efficiency of the photodetector. Provided that $E \ll 1$, the term in $E^2$ can be ignored. Hence, the output of the photodetector comprises a DC term, representing the signal expected from a conventional scanning optical microscope, as well as an AC term, which represents the differential signal.

The minimum detectable E is now estimated, by considering the signal/noise ratio (S/N) of the differential signal. Hence $$S/N = \frac{I_S^2 R/2}{(4KT + 2IeR)\Delta fF} \quad (4)$$

where $I_0$ is the DC photodiode current, $I_s$ is the current at $\omega s$, R is the detector load impedance, $\Delta f$ is the system bandwidth, and F is the noise factor of the amplifier. Provided that $I_0 Re/2 \gg KT$, the thermal noise term in equation (4) can be ignored. At beam deflection frequencies of the order of 100 kHz, R can be sufficiently large to ensure that the shot noise limit is attained even at relatively low received optical power. Thus, the minimum detectable E (for which S/N would equal unity) is given by $$E_{min} = \sqrt{\frac{\hbar \omega_0 \Delta f F}{\eta A^2}} \quad (5)$$

In the above equations, E could be due to scattering at the object surface, as a result of topography, or a variation in the reflectivity. Considering the latter, and using a plane wave at normal incidence for simplicity, we can relate E to a refractive index variation, $\delta n$. We have:

$$(\delta n)_{min} = ((n^2 - 1)/2) E_{min} \quad (6)$$

The minimum detectable variation in refractive index can thus be written as:

$$(\delta n)_{min} = \frac{h^2 - 1}{2} \sqrt{\frac{h \omega_0 \Delta f F}{\eta A^2}} \qquad (7)$$

Applying equation (7) to the case of silicon (n=3.89, at λ=6328 Å), we see that for a received optical power ($A^2$) of 100 μW in a 10 kHz bandwidth, with ν=0.8 and F=2, the system can respond to a δn of $6 \times 10^{-5}$. This value compares favourably with that expected from phase contrast microscopes.

It should be borne in mind that one could resort to alternative techniques to achieve the object beam deflection. Examples of these include the use of a Bragg cell with frequency modulated drive. In this approach, the Bragg cell can also be used to perform fast scanning of the object.

Figure 2:
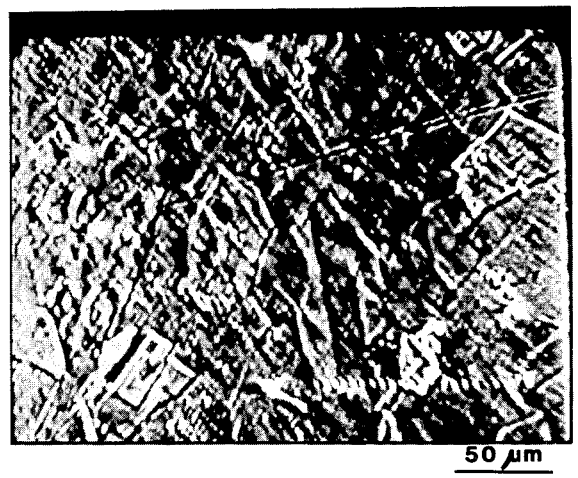
FIG. 2 shows the surface of a highly polished (un-etched) stainless steel sample.
Figure 3:
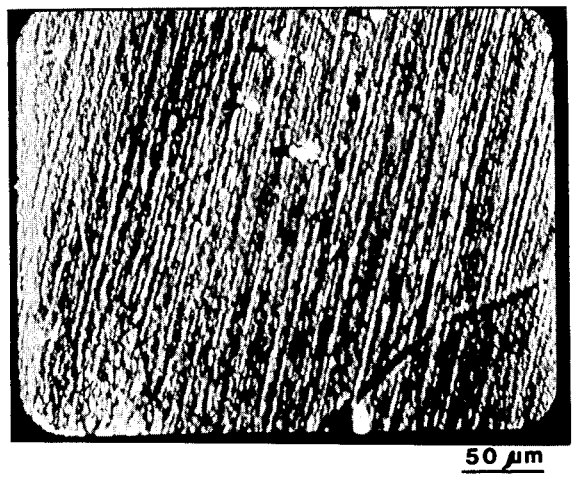
FIG. 3 is a micrograph of a polished diamond sample.

We have applied the system to the examination of a number of objects. FIG. 2 shows the surface of a highly polished (unetched) stainless steel sample. The granular structure of steel is perfectly visible. The observed contrast in this case is due primarily to topography. FIG. 3 is a micrograph of the surface of a polished diamond sample. The parallel lines running across the micrograph are the manifestation of the polishing process on the diamond. Both these images were obtained in a 30 kHz bandwidth, and the amplitude of the output signal was used to modulate the intensity of the beam of a storage oscilloscope.

Figure 4:
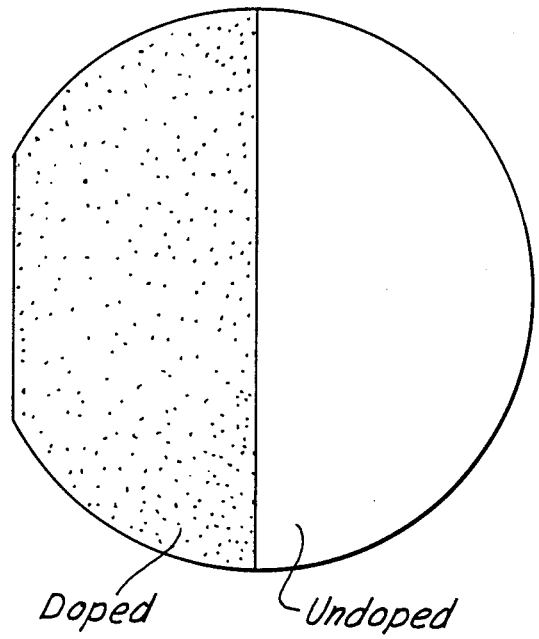
FIG. 4 is a representation of a partially-doped silicon wafer.

Some partly doped Si wafers (FIG. 4) were also examined. The dopants were either Si or As. The doping levels varied from $1013/cm^2$ to $1015/cm^2$. The differential amplitude microscope had no difficulty in detecting the doped-undoped boundary of all these samples, with a system bandwidth of 30 kHz. The signal strength obtained from the As-doped Si wafers were generally larger than those obtained from the Si-Si samples (for the same doping level).

Figure 5:
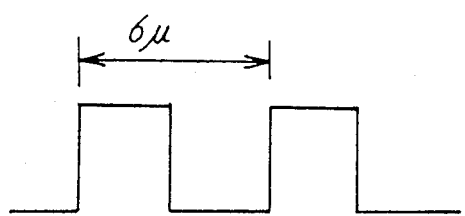
FIG. 5 is a signal display.
Figure 6A:
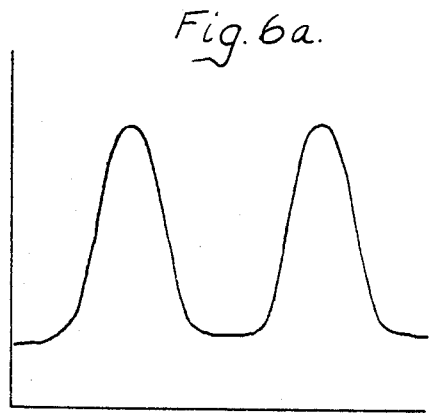
FIGS. 6a, 6b, 7a and 7b are CRT signal traces.
Figure 7A:
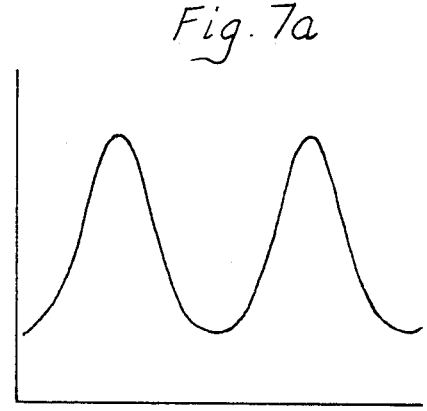
Figure 6B:
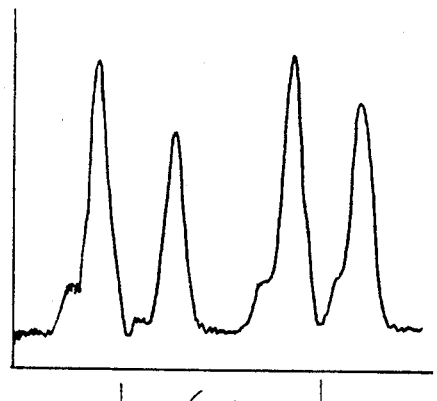
Figure 7B:
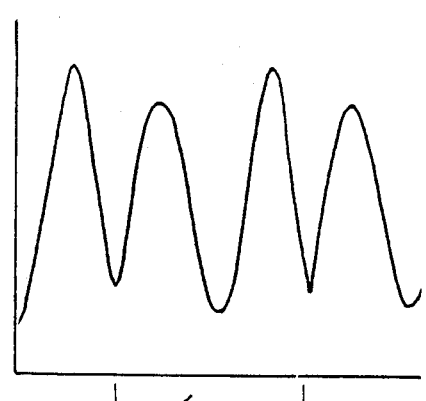

Because of the differential nature of the system, the signal resulting from a rectangular object (e.g. a track) will always consist of two peaks. The sample that had been looked at was a periodic rectangular grating of 6μ pitch (FIG. 5). FIGS. 6 and 7 show the results obtained with the system at different settings. In the first case (FIG. 6) the focal spot diameter was arranged to be around 2μ. FIG. 6a is the linescan resulting from an ordinary scanning optical microscope (SOM) which was converted from our system by switching off the beam deflector. FIG. 6b is the differential response of the sample. Both of the results indicate that the sample was of rectangular shape and accurate measurements of the track width are possible. We next increased the focal spot diameter from 2μ to 8μ. Since the spot size was much larger than the period of the structure, the SOM response looks more sinusoidal than rectangular (FIG. 7a). However, the differential response (FIG. 7b) still consists of two peaks. Since the distance between the peaks corresponds to a particular linewidth, this allows the measurement to be carried out with high accuracy.

I claim:
1. A scanning optical microscope comprising:
a source of optical radiation;
means for focussing a single beam of radiation from said source into an interrogating spot on a surface under examination;
means for scanning said interrogating spot across said surface;
deflecting means for providing an oscillatory deflection of said interrogating spot so as to move said interrogating spot sinusoidally across said surface as said interrogating spot is scanned across said surface; and
means for measuring the amplitude variation of the radiation reflected from said surface upon impingement of radiation at said oscillatory deflected scanning interrogating spot.

2. A scanning optical microscope as claimed in claim 1 wherein said deflecting means is adapted to oscillate the spot about a distance which is a fraction of one focal spot diameter.

3. A scanning optical microscope as claimed in claim 1 wherein the deflecting means is a standing-wave acousto-optic beam deflector.

4. A scanning optical microscope as claimed in claim 1 wherein the deflecting means is a Bragg cell.

5. A scanning optical microscope as claimed in claim 1 wherein said means for focussing radiation is adapted to produce a spot substantially larger than a period of the structure to be investigated.

6. A scanning optical microscope as claimed in claim 5 wherein the spot size is between 2 and 8 micrometers in diameter.

7. An optical scanning device, comprising: a source of optical radiation;
means for focussing a single beam of radiation from said source into an interrogating spot on a surface under examination;
means for scanning said interrogating spot across said surface;
deflecting means for providing an oscillatory deflection of said interrogating spot so as to move said interrogating spot sinusoidally across said surface as said interrogating spot is scanned across said surface; and
means for measuring the amplitude variation of the radiation reflected from said surface upon impingement of radiation at said oscillatory deflecting scanning interrogating spot.

8. An optical scanning device as in claim 7 wherein radiation reflected from said surface causes an AC signal to be produced at a deflection frequency of said oscillatory deflection, the measuring means measuring variations in said AC signal so as to measure the amplitude variation of the reflected radiation.

9. A method of investigating the topography of a surface, comprising the steps of:
focussing a single beam of radiation into an interrogating spot on the surface;
scanning said interrogating spot across said surface;
deflecting said interrogating spot during said scanning step so that the interrogating spot moves sinusoidally over the surface during scanning; and
measuring the amplitude variation of the radiation reflected from said surface upon impingement of said sinusoidally deflected scanning interrogating spot.

* * * * *